(12) United States Patent
Berger et al.

(10) Patent No.: US 11,882,385 B2
(45) Date of Patent: Jan. 23, 2024

(54) SYSTEM AND METHOD FOR SCALABLE MEDIA SWITCHING CONFERENCING

(71) Applicant: Cisco Technology, Inc., San Jose, CA (US)

(72) Inventors: Espen Berger, Oslo (NO); Pascal Bühler, Ål (NO); Jan Asle Kroknes, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/170,116

(22) Filed: Feb. 16, 2023

(65) Prior Publication Data

US 2023/0199146 A1 Jun. 22, 2023

Related U.S. Application Data

(63) Continuation of application No. 17/489,981, filed on Sep. 30, 2021, now Pat. No. 11,606,537, which is a
(Continued)

(30) Foreign Application Priority Data

May 25, 2010 (NO) .................................. 20100760
Jul. 2, 2010 (NO) .................................. 20100962

(51) Int. Cl.
*H04N 7/15* (2006.01)
*H04L 65/403* (2022.01)
*H04L 65/75* (2022.01)

(52) U.S. Cl.
CPC .......... *H04N 7/152* (2013.01); *H04L 65/403* (2013.01); *H04L 65/765* (2022.05)

(58) Field of Classification Search
CPC ..... H04N 7/152; H04L 65/403; H04L 65/765; H04L 12/18; H04L 12/1827;
(Continued)

(56) References Cited

U.S. PATENT DOCUMENTS 7,561,179 B2   7/2009   Johansen et al.
8,380,790 B2   2/2013   Lee et al.
(Continued)

FOREIGN PATENT DOCUMENTS

EP   1578129 A1   9/2005
EP   1683356 A1   7/2006
(Continued)

OTHER PUBLICATIONS

International Preliminary Report on Patentability for International Application No. PCT/NO2011/000158, dated Aug. 23, 2012, 4 Pages.
(Continued)

*Primary Examiner* — Yogeshkumar Patel

(57) ABSTRACT

A method including: establishing connections, at a server, to at least two client devices using a call control protocol, the call control protocol negotiating video formats and connection information for sending and receiving media streams; receiving information from a first client at the server, the information comprising meta-data describing different media streams the first client is configured to transmit; transmitting the information received from the first client to the at least one other client; receiving a subscribe message from the at least one other client at the server, subscribing to at least one available media stream from the first client; in response to receiving at least one subscribe message from the at least one other client, transmitting, by the server, a message instructing the first client to start transmitting media streams subscribed to by the at least one other client.

20 Claims, 5 Drawing Sheets

Related U.S. Application Data continuation of application No. 16/895,209, filed on Jun. 8, 2020, now Pat. No. 11,153,533, which is a continuation of application No. 13/113,501, filed on May 23, 2011, now Pat. No. 10,715,764.

(60) Provisional application No. 61/348,118, filed on May 25, 2010, provisional application No. 61/348,188, filed on May 25, 2010.

(58) Field of Classification Search
CPC ............. H04L 12/1813; H04L 12/1854; H04L 65/104; H04L 65/1104; H04L 65/611; H04L 65/65; H04L 63/20; H04L 65/1069; H04L 65/1095; H04L 65/4038; H04L 65/80; H04L 65/1001
See application file for complete search history.

(56) References Cited

U.S. PATENT DOCUMENTS

| | | | |
|---|---|---|---|
| 10,715,764 B2 | 7/2020 | Berger et al. | |
| 2005/0122392 A1* | 6/2005 | Johansen | H04N 7/14 348/E7.083 |
| 2005/0237931 A1* | 10/2005 | Punj | H04L 65/1101 370/229 |
| 2006/0293073 A1* | 12/2006 | Rengaraju | H04L 65/4038 348/E7.083 |
| 2007/0086366 A1* | 4/2007 | Luo | H04L 12/1827 370/254 |
| 2007/0201484 A1* | 8/2007 | Kenrick | H04M 3/42017 370/395.5 |
| 2007/0264989 A1* | 11/2007 | Palakkal | H04L 69/22 455/416 |
| 2007/0294346 A1 | 12/2007 | Moore et al. | |
| 2008/0266377 A1 | 10/2008 | Kim et al. | |
| 2009/0207988 A1* | 8/2009 | Huber | H04L 65/1086 379/202.01 |
| 2009/0285175 A1* | 11/2009 | Nix | H04L 65/1094 370/331 |
| 2010/0153574 A1* | 6/2010 | Lee | H04N 21/6377 709/231 |

FOREIGN PATENT DOCUMENTS

| | | |
|---|---|---|
| JP | 2000-50225 | 2/2000 |
| WO | 2005048600 A1 | 5/2005 |

OTHER PUBLICATIONS

International Search Report and Written Opinion for International Application No. PCT/NO2011/000158, dated Jul. 22, 2011, 9 Pages.
PCT International Type Search Report dated Jan. 26, 2011 on Application No. 2010/0962 filed Jul. 2, 2010, 4 pages.
Office Action dated Feb. 1, 2001, in Norway Patent Application No. 20100962, 5 pages.

\* cited by examiner

SYSTEM AND METHOD FOR SCALABLE MEDIA SWITCHING CONFERENCING

CROSS-REFERENCE TO RELATED APPLICATIONS

The present application is a continuation of and claims the benefit of U.S. application Ser. No. 17/489,981, filed Sep. 30, 2021, which in turn is a continuation of Ser. No. 16/895,209, filed Jun. 8, 2020, now U.S. Pat. No. 11,153,533, issued Oct. 19, 2021, which in turn is a continuation of U.S. application Ser. No. 13/113,501, filed May 23, 2011, now U.S. Pat. No. 10,715,764, issued Jul. 14, 2020, which in turn claims priority to U.S. Provisional Application No. 61/348,118, filed May 25, 2010 and also claims priority to Norwegian Application No. 20100760, filed May 25, 2010 and Norwegian Application No. 20100962, filed Jul. 2, 2010. The above-identified applications are hereby incorporated by reference in their entireties.

TECHNICAL FIELD

The exemplary embodiments described herein relate to video conferencing and in particular to a system and a method for scalable media switching video conferencing.

BACKGROUND

Conventional multi party videoconferences use a push model for sending video and audio to clients. The conventional approach uses a centralized transcoding Multipoint Control Unit (MCU). The conventional approach implements audio mixing, video layout composition and conference control entirely on the centralized transcoding MCU. Using this approach, the MCU must implement the user experience rules such as generating the layouts seen by each individual user. Using a push model (i.e., the MCU providing the layout to the clients) makes it difficult for the clients to override the MCU. The video layout composition generally includes decoding of each incoming stream, mixing the video layout composition for each of the participating clients, and encoding the mixed outgoing streams. This generally introduces unwanted delays (latency) in the communication between participating clients.

U.S. Pat. No. 7,561,179/EP1683356 (the contents of both of which are incorporated herein by reference) describes a system and method using a non-transcoding MCU or switching MCU, wherein the non-transcoding MCU receives capability information from the different clients participating in a multi-party videoconference. Based on the received capability information, the non-transcoding MCU instructs the different clients to transmit multimedia streams comprising partial frames adjusted to fit into the capabilities of the receiving clients participating in the videoconference. Two main methods of transmitting multimedia streams comprising partial frames are disclosed in the patent. One being multicasting several video streams of different quality, e.g. resolution, size etc., to the non-transcoding MCU, the other being using scalable video coding techniques such as SVC, wherein multiple levels of video quality are embedded within one stream. In both cases, the non-transcoding MCU then has the option of only passing on the partial frames to the clients that the non-transcoding MCU knows the clients can handle, based on the previously received capability information, or the non-transcoding MCU can function as a multi-cast router, passing on all received partial frames to all participating clients.

However, the use of a centralized unit to determine which video streams and/or resolution of video streams a receiving client should receive potentially limits the flexibility of the user experience and user interface of a client.

SUMMARY

A method including: establishing connections, at a server, to at least two client devices using a call control protocol, the call control protocol negotiating video formats and connection information for sending and receiving media streams; receiving information from a first client device at the server, the information comprising meta-data describing different media streams the first client device is configured to transmit; transmitting the information received from the first client device to the at least one other client device; receiving a subscribe message from the at least one other client device at the server, subscribing to at least one available media stream from the first client device; in response to receiving at least one subscribe message from the at least one other client device, transmitting, by the server, a message instructing the first client device to start transmitting media streams subscribed to by the at least one other client device; receiving, by the server, the media streams subscribed to by the at least one other client device from the first client device; and transmitting, by the server, the media streams subscribed to by the at least one other client device to the at least one other client device.

An apparatus including: a memory device that stores data; and a processor that executes instructions associated with the data in order to establish connections to at least two client devices using a call control protocol, the call control protocol negotiating video formats and connection information for sending and receiving media streams, process information from a first client device, the information comprising meta-data describing different media streams the first client device is configured to transmit, transmit the information received from the first client device to the at least one other client device, process a subscribe message received from the at least one other client device, subscribing to at least one available media stream from the first client device, in response to receiving at least one subscribe message from the at least one other client device, transmit a message instructing the first client device to start transmitting media streams subscribed to by the at least one other client device, process the media streams subscribed to by the at least one other client device received from the first client device, and transmit the media streams subscribed to by the at least one other client device to the at least one other client device.

A method including: establishing a connection with a server using a call control protocol, the call control protocol negotiating video formats and connection information for sending and receiving media streams; receiving information from the server, the information comprising meta-data describing different media streams a first client device is configured to transmit; deciding, in response to receiving the information on the different media streams the first client device is configured to transmit, which of available media streams from the first client device the at least one other client device will subscribe to; transmitting a subscribe message to the server, subscribing to at least one available media stream from the first client device; and receiving the media streams subscribed to from the server.

An apparatus including: a memory device that stores data; and a processor that executes instructions associated with the data in order to establish a connection with a server using a call control protocol, the call control protocol negotiating video formats and connection information for sending and receiving media streams, process information received from the server, the information comprising meta-data describing different media streams a client device is configured to transmit, decide, in response to receiving the information on the different media streams the client device is configured to transmit, which of available media streams from the client device to subscribe to, transmit a subscribe message to the server, subscribing to at least one available media stream from the client device, and receive the media streams subscribed to from the server.

BRIEF DESCRIPTION OF THE DRAWINGS

In order to make the exemplary embodiments described herein more readily understandable, the discussion that follows will refer to the accompanying drawings, wherein.

DETAILED DESCRIPTION

Exemplary embodiments are discussed herein and with reference to the accompanying drawings. However, people skilled in the art will realize other applications and modifications within the scope of the invention as defined in the enclosed independent claims.

For clarity, a client, depending on the context in which it is described, is also interchangeably referred to as an endpoint or a video conference endpoint. A client, according to the exemplary embodiments described herein, may be implemented in a video conference application in a personal computer (PC), tablet computer, PDA (personal digital assistant), cell phone or similar device, or as an integrated part of a standalone device.

Figure 1:
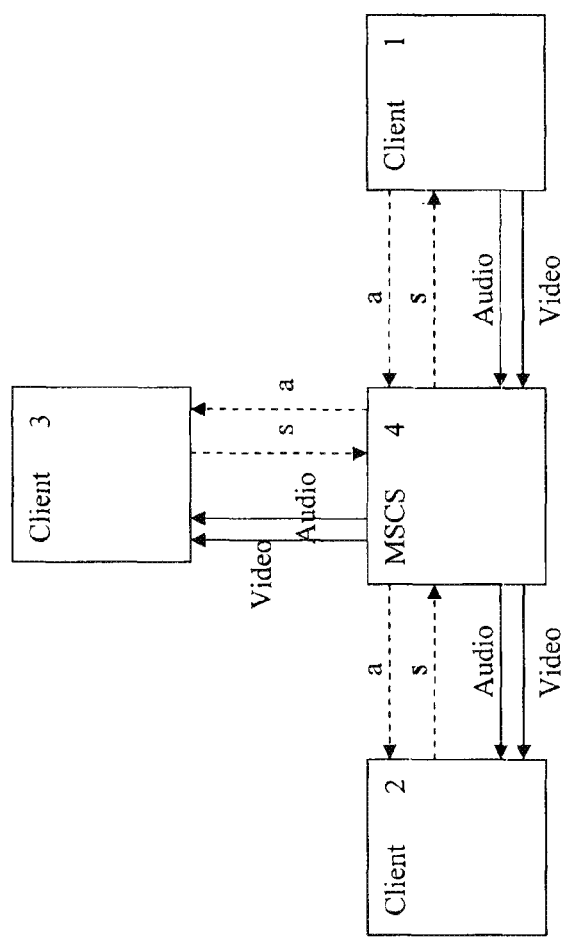
FIG. 1 illustrates an exemplary communication system.

FIG. 1 is a block diagram showing an exemplary communication system. The exemplary system comprises a central unit, which may be a media switching conference server (MSCS) 4, and three clients, 1, 2, 3. The MSCS and the clients communicate over a communication network, not shown, typically a packet switched network such as an IP (Internet Protocol)-network.

In an exemplary peer-to-peer embodiment, a first client 1 (Client 1) initiates a video call to a second client (Client2) using a call control protocol. The call control protocol is preferably SIP (RFC3261), but could also be ITU-T H.323 (12/09) or Jingle (XEP-0166 2009-12-23) or any other suitable call control protocol. Using the call control protocol, the clients negotiate video formats, i.e. codecs, and connection information such as port numbers. In a SIP implementation, the SIP protocol is used for call setup and SDP (Session Description Protocol defined in RFC 2327) is used for the codec and port negotiation.

Using RTCP SDES (RFC33550) messages, Client 1 transmits announce (a) messages to the central unit, or MSCS, 4. The announce messages include meta-data describing different media streams Client 1 is configured to transmit. Client 1 may announce that it is configured to transmit video of different resolutions (e.g. high, low, and medium), audio, and video from different positions or angles, such as a presenter camera, an audience camera or a document camera. Client 1 is considered to be configured to transmit different media streams as along as Client 1 includes the hardware and/or software to transmit the different media streams. Client 1 may announce that its main camera has certain resolutions (720p, 448p, and 1 80p), and then the MSCS 4 can transmit instructions to Client 1 requesting the resolutions subscribed to by the other clients. MSCS 4 is sometimes referred to merely as the server.

The MSCS 4 may instruct Client 1 to alter the resolutions that Client 1 makes available (i.e, instructs Client 1 to change the resolutions as follows: 720p→576p and 448p→288p). The server may instruct Client 1 to change resolutions if the server detects that no clients are interested in a particular resolution (i.e., no client is interested in 720p, but they are interested in 576p). The server may instruct Client 1 to change resolutions if the server detects that Client 1 must send another resolution. For example, if the server is forwarding 720p from Client 1 to other clients, and the server detects that 360p is required, then the server sends an update message to Client 1 instructing Client 1 to generate both 720p and 360p. Thus, in terms of scalability, the MSCS 4 can optimize the resolution during the conference. The MSCS 4 can control the resolution and bitrate to match, as close as possible, the capabilities/requests of the various receiving clients.

The MSCS 4 may announce virtual streams to an endpoint, wherein the MSCS 4 selects how many and what quality (i.e., resolution) is required for each stream. A virtual stream is used to define how a Client may request a multiple of streams from the server and be able to detect what it receives. The Client may request for 1× large 720p stream, with virtual identifier 1, and 2× small 180p streams with virtual identifiers 2 and 3, respectively. When the server forwards virtual streams to the Clients, it tags the forwarded streams with the virtual identifiers specified by the requesting Client. A benefit to using virtual streams is that the Client does not need to know about all streams available in the conference. If there are 100+ participants in a conference, server may hide this fact from the Client (i.e., hide the fact that there are more physical streams that could be received) because the Client may be limited to 10 physical streams (for example).

When using virtual streaming, the Client may request a single stream of 1×720p with virtual stream identifier=12. The server then forwards the active speaker and tags the stream with identifier 12, wherein when the server forwards a new stream the virtual stream identifier stays the same. The RTP stream will change, to the receiver will see SSRC changes, but the virtual stream identifier stays the same.

The server may announce two virtual streams to the Clients, even if there are 20 participants in the conference. The server selects the two most important streams (e.g., two loudest speakers based on audio level) and forwards the two physical streams to the clients.

Returning to FIG. 1, after receiving the announce message (a) from Client 1, the MSCS 4 relays the announce message to other endpoints participating in the call, i.e. in this example only to Client 2. Client 2 receives the information of the different media streams Client 1 is configured to transmit and makes a decision on which of the available media streams to subscribe to. Client 2 may make the decision based on processing power (i.e., number of operations performed per a unit of time) of Client 2, bandwidth restrictions between the client and the MSCS 4, and/or a layout displayed on a screen connected to Client 2.

After Client 2 has made the decision on which media streams to subscribe to, Client 2, using a RTCP APP (RFC 3550) message, transmits a subscribe message (s) to the MSCS 4 indicating which of the available media streams Client 2 wants to subscribe to. Again, the MSCS 4 relays the subscribe message from Client 2 to Client 1 requesting or instructing Client 1 to start transmitting media streams subscribed to by Client 2. Client 1 then starts to transmit subscribed media streams to the MSCS 4 that finally relays the media streams to Client 2.

In an exemplary multi-site embodiment, a first client 1 (Client 1) initiates a video call to a second client 2 (Client2) and a third client 3 (Client 3). Client 1 again transmits an announce (a) message to the MSCS 4, and after receiving the announce message (a) from Client 1, the MSCS 4 relays the announce message to both Client 2 and Client 3. Client 2 and Client 3 both receives the information of the different media streams Client 1 is configured to transmit and makes decisions on which of the available media streams to subscribe to.

After Client 2 and Client 3 have made their respective decisions on which media streams to subscribe to, both Client 2 and Client 3 transmit a subscribe message (s) to the MSCS 4 indicating which of the available media streams each of the Client 2 and Client 3, respectively, wants to subscribe to. The MSCS 4 aggregates the received subscription messages and transmits a subscribe message (s) to Client 1 requesting or instructing Client 1 to start transmitting media streams subscribed to by Client 2 and Client 3. Alternatively, MSCS 4 may transmit the subscription messages (separately or in parallel) to Client 1. Client 1 then starts to transmit the subscribed media streams to the MSCS 4. In case both Client 2 and Client 3 subscribe to a same media stream, the MSCS 4 relays the subscribed media streams to both Client 2 and Client 3. In case Client 2 and Client 3 subscribe to different media streams, Client 1 preferably multiplexes the different media streams and transmits the multiplexed media streams to the MSCS 4 on a single port. In response to receiving the multiplexed media streams, the MSCS 4 de-multiplexes the media streams and relays the media streams to the respective subscribing clients. Alternatively, Client 1 could transmit the different media streams separately to different ports of the MSCS 4.

Although not explicitly shown in the FIG. 1, Client 2 and Client 3 are also transmitting announce messages to the MSCS 4. Client 1, Client 2 and Client 3 decides on which of the available media streams from the other two clients to subscribe to, and transmits subscribe messages to the MSCS 4. The MSCS 4 aggregates the received subscription messages, and transmits a subscribe message to each of the clients requesting or instructing the clients to start transmitting media streams subscribed to by the respective two other clients. The MSCS 4 then usually receives at least three different media streams, of which two different media streams are subscribed to by each of the respective clients (i.e. Client 2→Client 1 and Client 3, Client 3→Client 1 and Client 2, etc.). Thus, the MSCS 4 may multiplex media streams subscribed to by one client before transmitting the media streams to the client on a single port. However, multiple ports could be used.

According to an exemplary embodiment, the MSCS 4 automatically requests or instructs connected clients to transmit an audio stream, and the MSCS 4 is automatically transmitting all received audio streams to all connected clients. Thus, the clients do not need to actively decide on subscribing to audio streams. This "forward to all policy" ensures lowest possible latency of forwarded audio packets. Still, a client might stop the audio stream if a microphone is muted at the client, overriding the automatic transmission of audio that is automatically transmitted from the client.

The client is responsible of mixing all incoming audio packets before being output by a speaker or other device. The client lip-syncs audio and video streams from a transmitting client using available meta-information, e.g. synchronizing audio and video packets from a client with matching RTCP SDES client names.

In multi-site conferences, it is common that several of the participants are silent most of the time. However, the silent participants often introduce unwanted noise into the conference, noise such as coughing, turning pages, etc. that are picked up by the microphone. Also, mixing audio from non-talking participants introduces unnecessary processing load on a client. In such circumstances it is preferable to stop the audio streams from those participants before being transmitted to the client. The MSCS 4 may be configured to only relay the N-loudest (N being an integer less than all clients participating in the video conference) audio streams based on the audio activity level in the RTP packets. Alternatively, the MSCS 4 may transmit only audio packets with an energy level that is above a predefined threshold.

Figure 2:
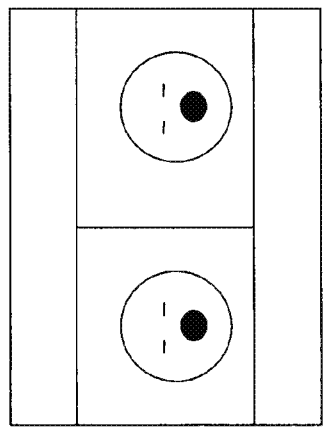
FIG. 2 illustrates two exemplary layouts of a client display.
Figure 2:
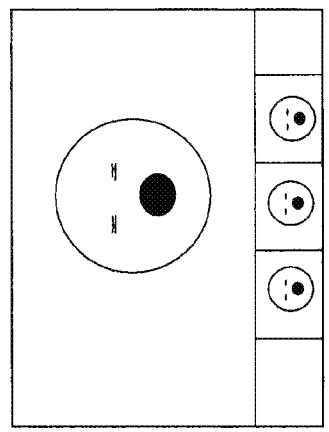

FIG. 2 illustrates two possible layouts of a client display. FIG. 2B displays an equal view layout, where video streams from two clients are shown. The equal view layout is typically used in cases where three clients participate in a call, or in a peer-to-peer call displaying the distant client and a self view, or alternatively to display two media streams from one client, one being video and the other a presentation. FIG. 2A displays an active speaker layout, the active speaker layout displaying one large video stream and three smaller video streams. Active speaker layouts and methodologies are well known to the person skilled in art.

According to a preferred embodiment, a client receiving multiple subscribed streams mixes the subscribed video streams locally. In particular, during a conference, a user of a client might want to change layouts in its video client. The local mixing capabilities in the client make that easy. The client can subscribe to receiving a new media stream if the new layout suggests that other media streams might be needed, and/or unsubscribe media streams that are not needed anymore. Similarly, the client might change layout automatically in case another client leaves or enters the conference, or as described below when an active speaker changes.

Now referring to FIG. 2A, video streams from four different participants are displayed in the active speaker layout, where the active speaker, or current speaker window, is larger than the three other participants windows. The three smaller windows occupy a smaller area, thus the video streams displayed in these windows can be of a lower resolution than the video displayed in the large window and still have the same visual quality. The client therefore does not need to receive a video stream of the highest possible quality for these windows and decides to subscribe to low quality video streams, while at the same time deciding to subscribe to a high quality stream for the large window. Then, in case a user in one of the smaller windows becomes the active speaker, the client will decide to display the video stream of that user in the large display and the video stream of the previous speaker in a small display. The client then transmits a unsubscribe message and a subscribe message to the MSCS 4, un-subscribing to high resolution video stream of the previous speaker and subscribing to the low resolution video stream of the previous speaker. The client also transmits a unsubscribe message unsubscribing to the low resolution video stream of the new active speaker and a subscribe message subscribing to the high resolution video stream of the new active speaker. The MSCS 4 then relays the subscribe and unsubscribe messages to the relevant transmitting clients, requesting or instructing transmitting endpoints to stop transmitting the now unsubscribed video streams and start transmitting the now subscribed media streams to the MSCS 4.

In another exemplary embodiment, when using a video conference application in a PC, the decision on changing subscription of video streams may be made based on the current screen size, e.g. full screen or small screen.

In yet another exemplary embodiment, the decision on which media streams to subscribe to is made based on bandwidth restrictions. The client cannot subscribe to an amount of media data larger than the client can decode, and the client must split the available bit rate between the different media streams to obtain the best overall visual quality for a client user.

Figure 3:
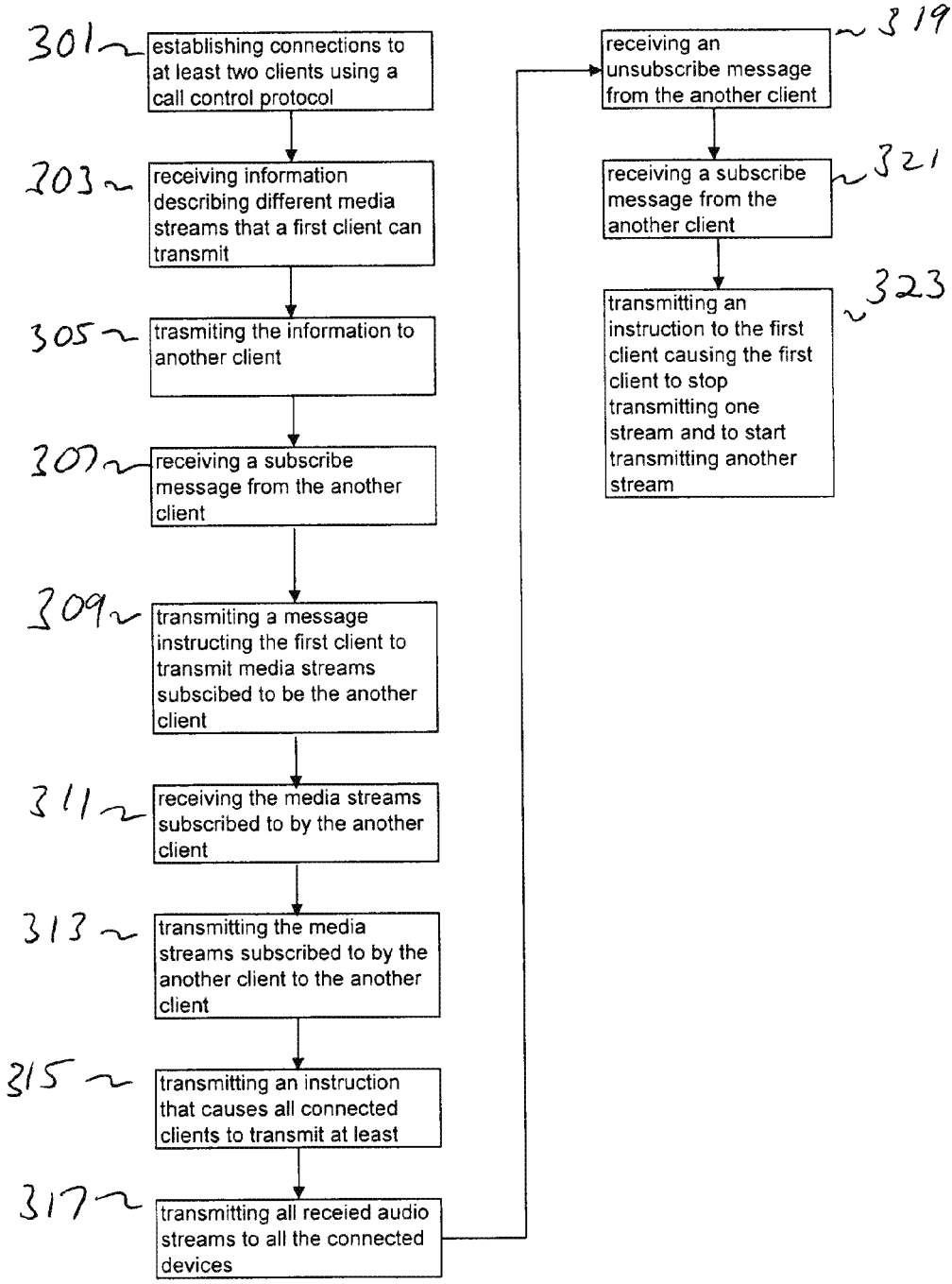
FIG. 3 illustrates a method executed by a server in the exemplary communication system.

FIG. 3 illustrates a method executed by a server (MSCS 4, for example) in the exemplary communication system (FIG. 1). The method in FIG. 3 includes a step 301 of establishing connections to at least two client devices using a call control protocol, the call control protocol negotiating video formats and connection information for sending and receiving media streams. The method in FIG. 3 includes a step 303 of receiving information from a first client device, the information comprising meta-data describing different media streams the first client device is configured to transmit. The method in FIG. 3 includes a step 305 of transmitting the information received from the first client device to the at least one other client device. The method in FIG. 3 includes a step 307 of receiving a subscribe message from the at least one other client device, subscribing to at least one available media stream from the first client device. The method in FIG. 3 includes a step 309 of in response to receiving at least one subscribe message from the at least one other client device, transmitting a message instructing the first client device to start transmitting media streams subscribed to by the at least one other client device. The method in FIG. 3 includes a step 311 of receiving the media streams subscribed to by the at least one other client device from the first client device. The method in FIG. 3 includes a step 313 of transmitting the media streams subscribed to by the at least one other client device to the at least one other client device. The method in FIG. 3 includes a step 315 of transmitting an instruction that causes all connected client devices to transmit at least one audio stream to the server. The method in FIG. 3 includes a step 317 of transmitting all received audio streams to all the connected client devices. The method in FIG. 3 includes a step 319 of receiving an unsubscribe message from the at least one other client device, unsubscribing to at least one of the media streams subscribed to by the at least one other client device. The method in FIG. 3 includes a step 321 of receiving a subscribe message from the at least one other client device, subscribing to at least one other available media stream from the first client device. The subscribe and unsubscribe messages may be received by the server together or separately. The method in FIG. 3 includes a step 323 of in response to receiving the subscribe and unsubscribe messages from the at least one other client device, transmitting a message instructing the first client device to start transmitting media streams subscribed to by the at least one other client device, and to stop transmitting media streams unsubscribed to by the at least one other client device.

Figure 4:
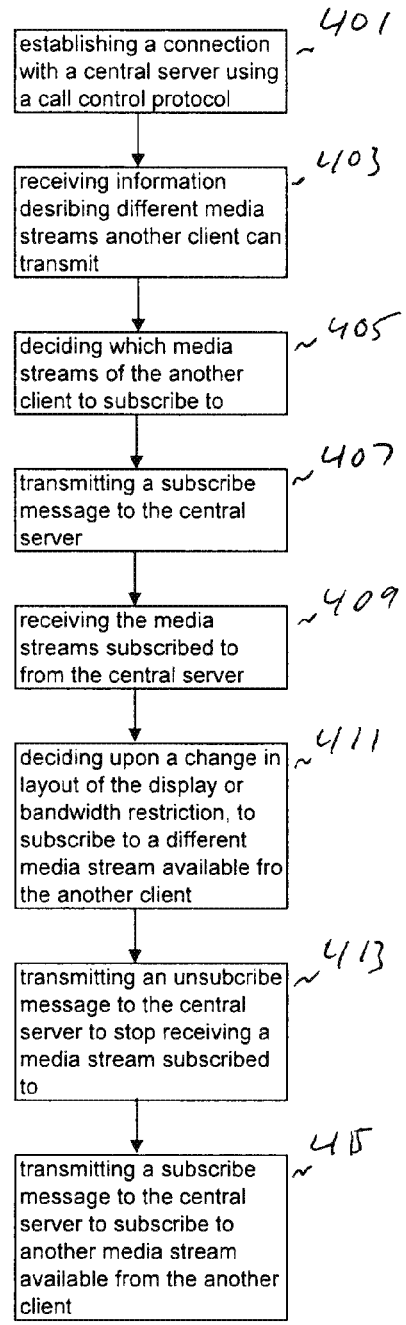
FIG. 4 illustrates a method executed by a client device in the exemplary communication system.

FIG. 4 illustrates a method executed by a client device (Client 1, Client 2, or Client 3) in the exemplary communication system (FIG. 1). The method in FIG. 4 includes a step 401 of establishing a connection with a server using a call control protocol, the call control protocol negotiating video formats and connection information for sending and receiving media streams. The method in FIG. 4 includes a step 403 of receiving information from the server, the information comprising meta-data describing different media streams a first client device is configured to transmit. The method in FIG. 4 includes a step 405 of deciding, in response to receiving the information on the different media streams the first client device is configured to transmit, which of available media streams from the first client device the at least one other client device will subscribe to. The method in FIG. 4 includes a step 407 of transmitting a subscribe message to the server, subscribing to at least one available media stream from the first client device. The method in FIG. 4 includes a step 409 of receiving the media streams subscribed to from the server. The method in FIG. 4 includes a step 411 of deciding upon a change in layout of the display or the bandwidth restriction, to subscribe to at least one different available media stream from the first client device. The method in FIG. 4 includes a step 413 of transmitting an unsubscribe message to the server, unsubscribing to at least one of the media streams subscribed to. The method in FIG. 4 includes a step 415 of transmitting a subscribe message to the server, subscribing to at least one other available media stream from the first client device.

Figure 5:
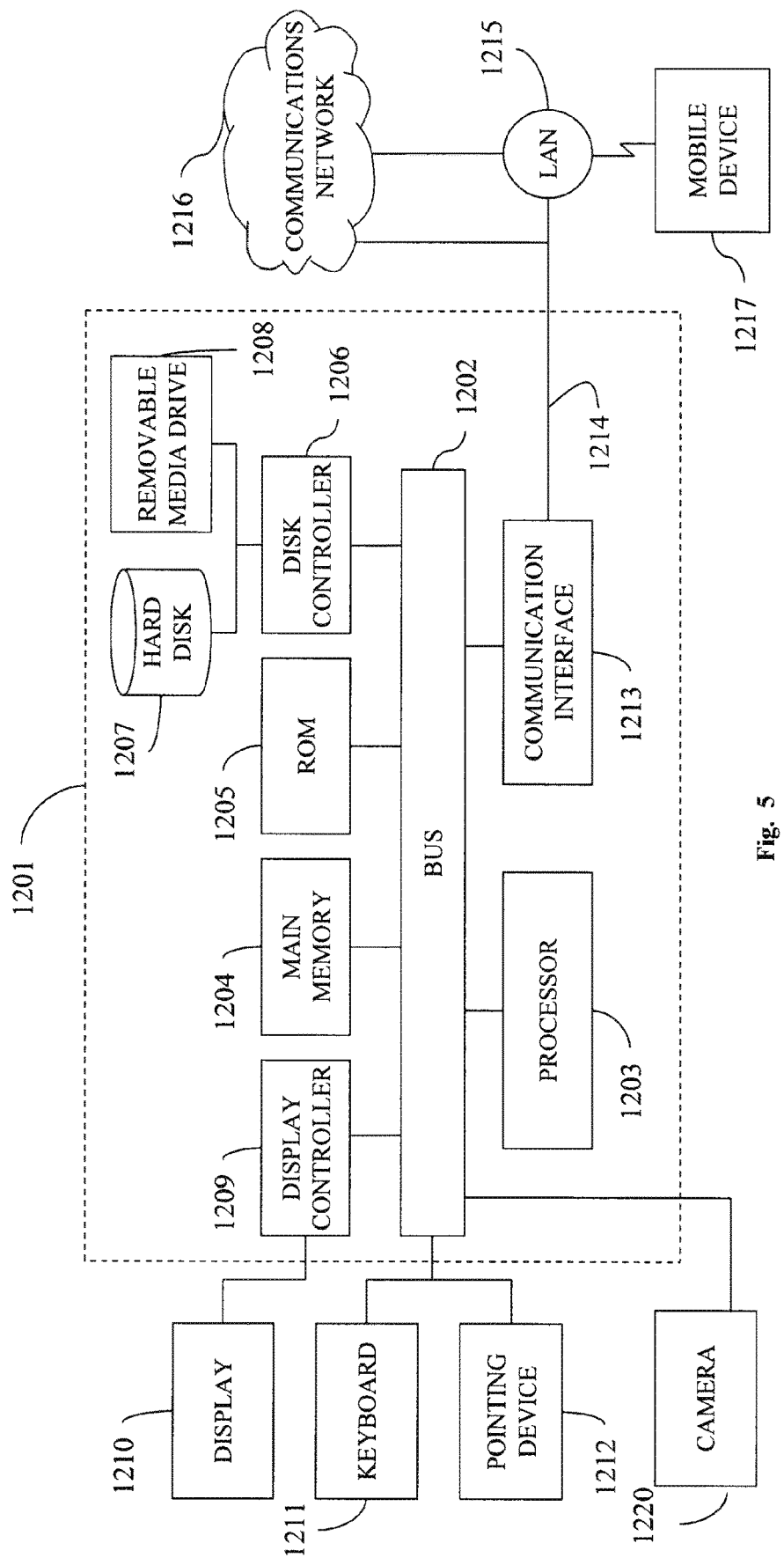
FIG. 5 illustrates an exemplary hardware included in the communication system.

FIG. 5 illustrates a computer system 1201 upon which an embodiment of the client or MSCS may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive).

The storage devices may be added to the computer system 1201 using an appropriate device interface (e.g., small computer system interface (SCSI), integrated device electronics (IDE), enhanced-IDE (E-IDE), direct memory access (DMA), or ultra-OMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210.

The computer system 1201 performs a portion or all of the processing steps in response to the processor 1203 executing one or more sequences of one or more instructions contained in a memory, such as the main memory 1204. Such instructions may be read into the main memory 1204 from another non-transitory computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions.

As stated above, the computer system 1201 includes at least one non-transitory computer readable medium or memory for holding instructions programmed according to the teachings of the exemplary embodiments discussed herein and for containing data structures, tables, records, or other data described herein. Examples of non-transitory computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

Stored on any one or on a combination of non-transitory computer readable media, exemplary embodiments include software for controlling the computer system 1201, for driving a device or devices for implementing functionality discussed herein, and for enabling the computer system 1201 to interact with a human user. Such software may include, but is not limited to, device drivers, operating systems, development tools, and applications software.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method comprising:
   obtaining, by a server from a first client device, information indicating that the first client device is configured to transmit at least two streams during a communication session with a second client device, wherein the at least two streams comprise a first video stream and a second video stream of different qualities;
   obtaining, by the server from the second client device, a first message, wherein the first message indicates a first configuration of a video conference application on the second client device;
   providing, by the server to the first client device, a second message that causes the first client device to start transmission of a video stream, wherein the transmitted video stream is the first video stream or the second video stream, and the transmitted video stream is based at least in part upon information in the first message; and
   obtaining, by the server from the second client device, a third message indicating a second configuration of the video conference application different from the first configuration based on an event occurring during the communication session.

2. The method of claim 1, wherein the first configuration of the video conference application relates to a screen size of the video conference application.

3. The method of claim 1, wherein the first configuration of the video conference application relates to a layout displayed in the video conference application.

4. The method of claim 1, wherein the event relates to a user of the second client device changing the video conference application from the first configuration to the second configuration.

5. The method of claim 1, wherein the first video stream is a different resolution compared to the second video stream.

6. The method of claim 1, further comprising:
providing, by the server to the first client device, a fourth message that causes the first client device to stop transmission of the transmitted video stream based at least in part upon the third message.

7. The method of claim 1, wherein the communication session with the second client device is established using a call control protocol.

8. The method of claim 7, wherein the call control protocol is one of SIP, H.323 and Jingle.

9. A system comprising:
at least one memory element for storing data;
a communication interface configured to enable communications with devices during a communication session; and
at least one processor for executing instructions associated with the data, wherein executing the instructions causes the system to perform operations, comprising:
obtaining, from a first client device, information indicating that the first client device is configured to transmit at least two streams during a communication session with a second client device, wherein the at least two streams comprise a first video stream and a second video stream of different qualities;
obtaining, from the second client device, a first message, wherein the first message indicates a first configuration of a video conference application on the second client device;
providing, to the first client device, a second message that causes the first client device to start transmission of a video stream, wherein the transmitted video stream is the first video stream or the second video stream, and the transmitted video stream is based at least in part upon information in the first message; and
obtaining, from the second client device, a third message indicating a second configuration of the video conference application different from the first configuration based on an event occurring during the communication session.

10. The system of claim 9, wherein the first configuration of the video conference application relates to a screen size of the video conference application.

11. The system of claim 9, wherein the first configuration of the video conference application relates to a layout displayed in the video conference application.

12. The system of claim 9, wherein the first video stream is a different resolution compared to the second video stream.

13. The system of claim 9, wherein the operations further include:
providing, to the first client device, a fourth message that causes the first client device to stop transmission of the transmitted video stream based at least in part upon the third message.

14. The system of claim 9, wherein the communication session with the second client device is established using a call control protocol, and the call control protocol is one of SIP, H.323 and Jingle.

15. One or more non-transitory computer readable medium storing instructions that, when executed by at least one processor, cause the at least one processor to perform operations including:
obtaining, from a first client device, information indicating that the first client device is configured to transmit at least two streams during a communication session with a second client device, wherein the at least two streams comprise a first video stream and a second video stream of different qualities;
obtaining, from the second client device, a first message, wherein the first message indicates a first configuration of a video conference application on the second client device;
providing, to the first client device, a second message that causes the first client device to start transmission of a video stream, wherein the transmitted video stream is the first video stream or the second video stream, and the transmitted video stream is based at least in part upon information in the first message; and
obtaining, from the second client device, a third message indicating a second configuration of the video conference application different from the first configuration based on an event occurring during the communication session.

16. The one or more non-transitory computer readable medium of claim 15, wherein the first configuration of the video conference application relates to a screen size of the video conference application.

17. The one or more non-transitory computer readable medium of claim 15, wherein the first configuration of the video conference application relates to a layout displayed in the video conference application.

18. The one or more non-transitory computer readable medium of claim 15, wherein the first video stream is a different resolution compared to the second video stream.

19. The one or more non-transitory computer readable medium of claim 15, further comprising instructions that cause the at least one processor to perform operations including:
providing, to the first client device, a fourth message that causes the first client device to stop transmission of the transmitted video stream based at least in part upon the third message.

20. The one or more non-transitory computer readable medium of claim 15, wherein the communication session with the second client device is established using a call control protocol, and the call control protocol is one of SIP, H.323 and Jingle.

* * * * *

UNITED STATES PATENT AND TRADEMARK OFFICE
CERTIFICATE OF CORRECTION

Page 1 of 1

PATENT NO. : 11,882,385 B2
APPLICATION NO. : 18/170116
DATED : January 23, 2024
INVENTOR(S) : Espen Berger et al.

It is certified that error appears in the above-identified patent and that said Letters Patent is hereby corrected as shown below:

On the Title Page

Item (60) Related U.S. Application Data
Please replace "Provisional application No. 61/348,118, filed on May 25, 2010, provisional application No. 61/348,188, filed on May 25, 2010." with --Provisional application No. 61/348,118, filed on May 25, 2010.--

Signed and Sealed this
Twenty-fourth Day of September, 2024

Katherine Kelly Vidal
*Director of the United States Patent and Trademark Office*